March 26, 1974     P. J. CHENG     3,799,745

CARBON BLACK REACTOR

Filed June 30, 1971

INVENTOR.
P. J. CHENG

BY

Young & Quigg

ATTORNEYS

United States Patent Office 3,799,745
Patented Mar. 26, 1974

3,799,745
CARBON BLACK REACTOR
Paul J. Cheng, Bartlesville, Okla., assignor to
Phillips Petroleum Company
Filed June 30, 1971, Ser. No. 158,339
Int. Cl. C01b 49/00
U.S. Cl. 23—259.5    2 Claims

ABSTRACT OF THE DISCLOSURE

A carbon black reactor having a minimum cross-sectional area positioned upstream of the locus of discharge from the hydrocarbon feed inlet means, the walls of the reactor diverging outwardly from that locus to a vertically upstanding wall terminating the zone.

---

Figure 1:
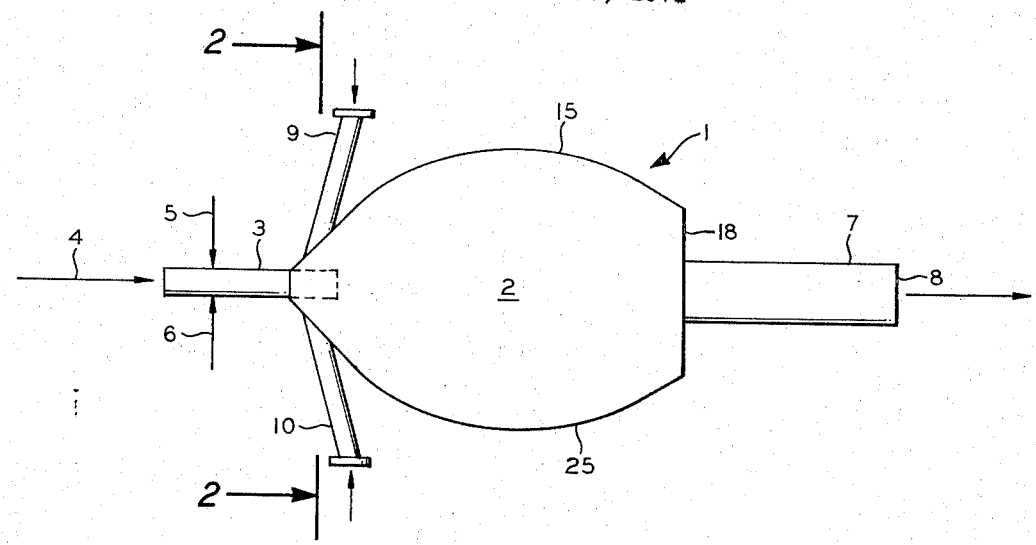

This invention relates to carbon black production.

In one of its more specific aspects, it relates to apparatus adapted to reduce the particle size distribution of the carbon black product.

Carbon black products, as commercially produced, are comprised of a wide range of individual blacks of individual properties, the total product manifesting properties which are a function of those individual properties. Accordingly, efforts are being continuously directed towards narrowing the range of property distribution of product blacks.

Among these efforts are those directed towards creating uniformity within the reaction zone by flame stabilization within the reaction section. The apparatus of this invention contributes to the solution of that problem.

According to this invention there is provided a carbon black reactor comprising a reaction section, this reaction section being adapted with a hydrocarbon feed inlet nozzle and with at least one fuel or hot combustion gas inlet nozzle adapted to discharge upstream of the hydrocarbon feed inlet nozzle. The reaction section is terminated by a downstream wall positioned substantially vertically.

In one embodiment of this invention the reaction zone attains its greatest dimension at the downstream wall.

In another embodiment of this invention the reaction zone attains its greatest dimension upstream of the downstream wall.

The reactor embodiments depicted herein are directed towards stabilizaton of the flame by introducing hot combustion gases proximate and upstream of the flame produced in the pyrolytic combustion of the hydrocarbon feed to create an aspiration effect thereon and to disrupt and to substantially eliminate that core of pyrolytically decomposing hydrocarbon feed which can be considered as emanating from the flame. The introduction of the hot combustion gases into the proximity of the flame is made in such a manner as to stabilize the oil flame and to distribute the pyrolytically-decomposing feed oil throughout the reaction chamber. Accordingly, the rate of mixing and of pyrolytic decomposition is increased and the decomposition is more uniformly accomplished throughout the zone. Consequently, the range of property distribution of the product black is narrowed appreciably.

Certain configurations of the reaction zone enhance the distribution of the pyrolytically decomposing feed and while any configuration employing the general principles set forth therein can be employed, the embodiments depicted herein are preferred.

The reactors of this invention will be constructed such that, either in elevation or in plan view, the walls of the reactor diverge outwardly from a locus proximate the feed inlet to a maximum dimension of the reaction zone. In some embodiments, the reactor walls will then converge inwardly towards the substantially vertical wall terminating the reaction zone and in which the exit conduit is positioned.

In other embodiments, the reactor walls will diverge outwardly to form the substantially vertical wall terminating the reaction zone, this wall being positioned at the point of maximum divergence.

In all instances, the wall will preferably diverge in a manner such that the reactor, in elevation or in plan view or both, is of arcuate configuration to impart a circulating motion to the gases within the reactor such that, upon being impinged on the substantially vertical downstream wall of the reaction zone, they are deflected back along the arcuate walls into the proximity of the inlet nozzle.

By "vertical downstream wall" as used herein and in the claims is meant a wall formed substantially perpendicular to the longitudinal axis of the reactor. This wall will be vertically positioned when the walls of the reactor diverge as viewed in elevation but will be horizontally positioned when the walls of the reactor diverge as viewed in plan.

Figure 2:
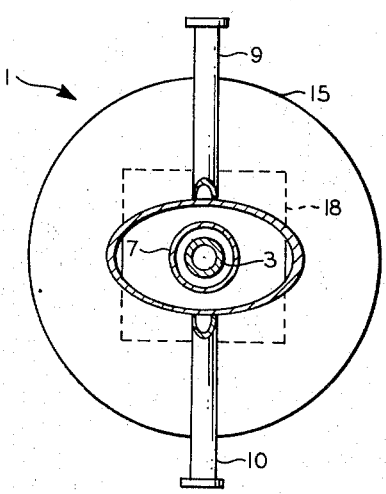
Figure 3:
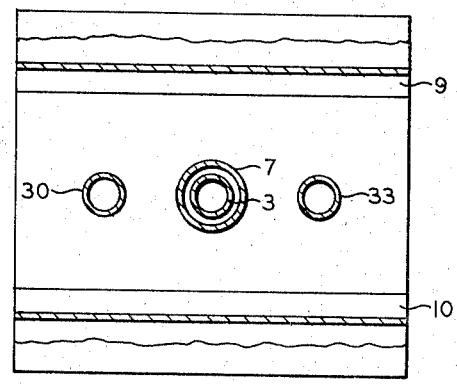
Figure 4:
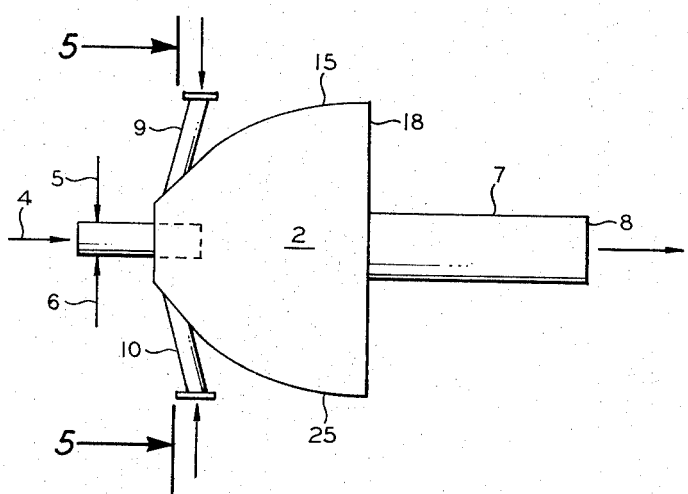
Figure 5:
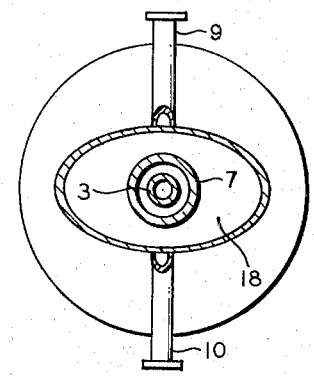

The apparatus of this invention is illustrated in the attached drawings in which FIG. 1 illustrates an embodiment in which a reaction chamber of expanding and contracting volume, as related to the feed entry point, is depicted; FIG. 2 is a view through section 2—2 of FIG. 1; FIG. 3 illustrates another embodiment in cross section; FIGS. 4 and 5 depict another embodiment of the reactor.

It is to be understood that the apparatus of this invention can be employed under any and all of the conventional operating conditions of producing carbon black including reactor feeds, fuels, oxidants, temperatures, pressures, air to feed ratios, and the like.

Referring now to FIG. 1, there is depicted reactor 1 having reaction section 2, feed introductory nozzle 3 adapted with a suitable number of conduits 4, 5 and 6 for the introduction of such reactants as hydrocarbon feed, fuel and oxidant, quench section 7 and outlet nozzle 8.

Reaction section 2 is adapted with inlet nozzles 9 and 10 which discharge into zone 2 preferably at a point upstream of the discharge of the feed from nozzle 3.

The inlet represented by nozzles 9 and 10 can be comprised of a series of any number of individually discharging nozzles for fuel and oxidant or hot combustion gases or can be in the form of a continuous port encircling nozzle 3 and discharging around the entire periphery thereof. Relatedly, the angle of discharge from nozzles 9 and 10, regardless of the configuration of the reaction zone, will be in an upstream direction, opposite to the general direction of the discharge from nozzle 3.

Nozzle 3 represents a single nozzle or the plurality of nozzles which can be employed. If a single nozzle is employed, it is advantageously positioned on an axis common with the longitudinal axis of quench section 7. If a plurality of nozzles are employed they are preferentially positioned to discharge angularly if necessary in the direction of the entrance of quench section 7 which is formed in the substantially vertical downstream wall 18 of the reactor. However, the configuration of reaction section 2 need not be circular in cross section. It can be of a rectangular cross section with nozzles 9 and 10 being formed as slotted entrances occupying any portion of the width or height of the reactangle, with acruate walls 15 and 25 diverging outwardly to a maximum and then converging inwardly towards the downstream wall 18.

In FIG. 2, the inlet end to zone 2 is shown as elliptical although the inlet end can be circular in cross section.

In FIG. 3 there is depicted a reactor in which the reaction section is rectangular in cross section, nozzles 9 and 10 are in the form of slots extending across the width of the reaction section and a plurality of feed inlet nozzles 3, 30 and 33 are positioned at the feed introduction end of the reactor.

In FIGS 4 and 5, arcuate walls 15 and 25 diverge to a maximum to form the substantially vertical wall 18 which terminates the reaction zone.

Inasmuch as the effect of the materials introduced upor of those reactants introduced through inlets 9 and 10 to establish major flow patterns paralleling and disturbing that material emitted from the feed inlet nozzle with some portion of the gases recirculating from the inlet to the quench section back along the wall of the reaction section to the vicinity of the burner, it is desirable that the inlets be sized to establish such flow and such disturbance. Inasmuchas the effect of the materials introduced upstream of the discharge of the feed introductory nozzle will depend both on the quantity so introduced and the velocity at which the introduction is made, these factors can be easily determined by ascertaining the property of the carbon blacks produced under variable conditions of introduction.

FIGS. 4 and 5, in which like parts are identified by those numerals employed relative to FIG. 1, depict another embodiment of the invention in which a different configuration is given of the reaction section of the reactor. In this instance, the downstream wall of reaction zone 2 has a vertical dimension equal to the maximum vertical dimension of the reaction zone. In this embodiment, that flow paralleling and disturbing that material emitted from the feed inlet nozzle is additionally mixed at the downstream wall of the reaction zone such that upon recirculation to the proximity of the burner, these materials are thoroughly mixed with those materials emitted from the burner and with that material introduced through the inlets 9 and 10.

As concerns the downstream wall of the reaction section, it is to be understood that the walls of the reaction section can be formed so as to discharge directly into the quench zone in the absence of the downstream wall being formed having any substantially vertical portion. However, it is preferred that the downstream wall of the reaction section terminate in a vertical wall in which the entrance to the quench section is positioned in order to insure the establishment of the desired recirculation back upstream along the wall of the reaction section into the proximity of the burner.

It will be evident from the foregoing that various modifications can be made to the method of this invention. However, such are considered to be within the scope of the invention.

What is claimed is:

1. A reactor comprising:
   (a) a reaction section formed of side walls and a vertically upstanding downstream closing wall, said section having a minimum cross-sectional area at its upstream end, said side walls extending arcuately between said upstream end and said downstream closing wall;
   (b) hydrocarbon feed introduction means extending into said section through said upstream end and terminating at a locus spaced apart from said upstream end; and,
   (c) reactant inlet means adapted from discharge into said reaction section through said side walls and between said upstream end and the termination of said hydrocarbon feed introduction means, said reactant inlet means being adapted for discharge towards said upstream end of said section.

2. The reactor of claim 1 in which said upstream end of said reaction section is closed by a vertically upstanding wall.

References Cited
UNITED STATES PATENTS

| | | | |
|---|---|---|---|
| 1,890,188 | 12/1932 | Morrell et al. | 23—259.5 X |
| 3,333,928 | 8/1967 | Bayashi | 23—259.5 X |
| 2,391,067 | 12/1945 | Mitchell | 23—259.5 X |
| 2,656,254 | 10/1953 | Heller | 23—259.5 X |
| 2,343,866 | 3/1944 | Hincke | 23—277 R X |
| 2,582,938 | 1/1952 | Eastman et al. | 48—196 R |

JAMES H. TAYMAN, JR., Primary Examiner

U.S. Cl. X.R.

423—450, 456; 431—9, 8, 174, 185, 159